Jan. 2, 1951 A. F. HICKMAN 2,536,933
VEHICLE SPRING SUSPENSION
Filed Dec. 22, 1944 4 Sheets-Sheet 1
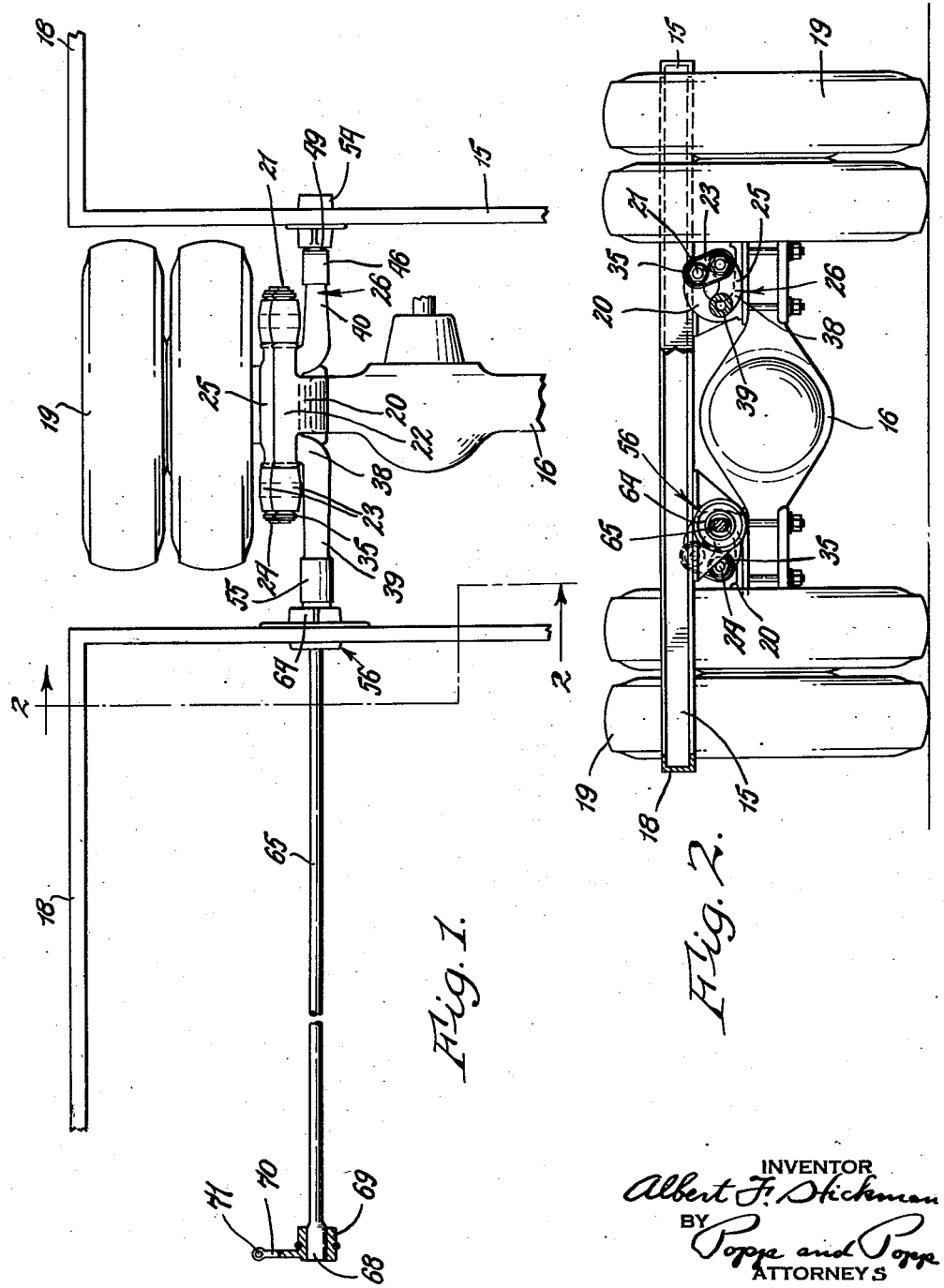
INVENTOR
Albert F. Hickman
BY
Popps and Popps
ATTORNEYS

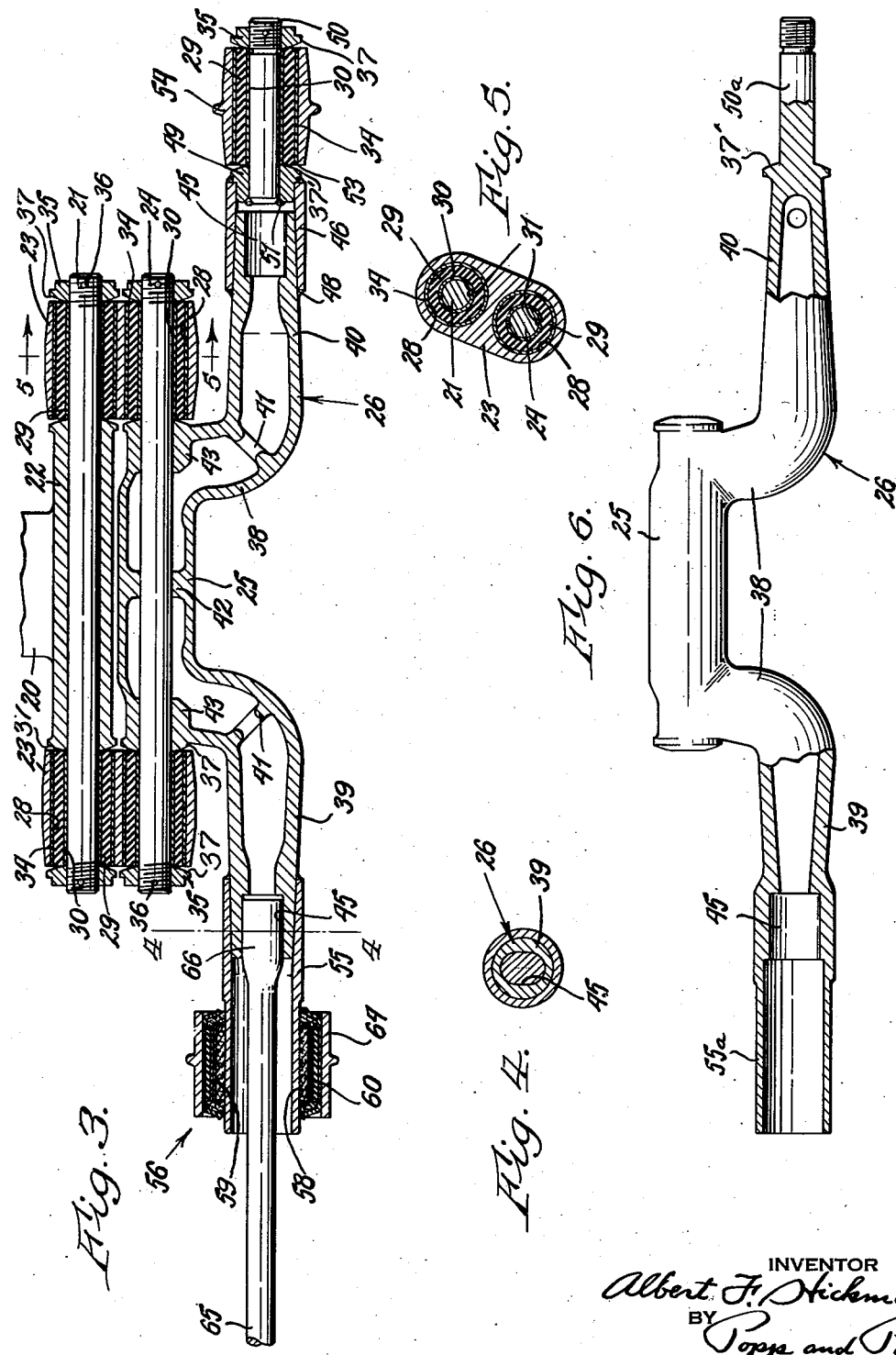

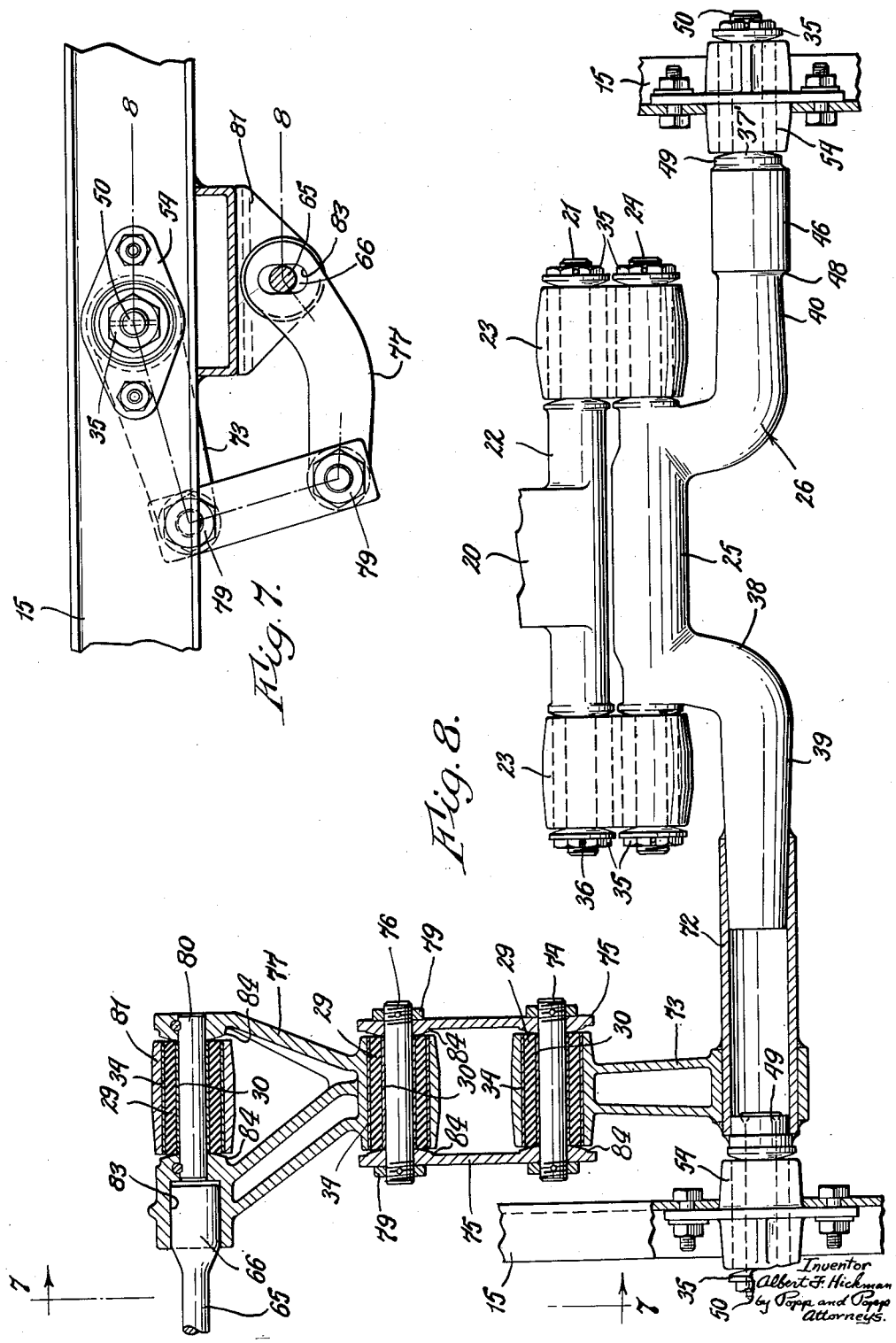

Jan. 2, 1951 A. F. HICKMAN 2,536,933
VEHICLE SPRING SUSPENSION
Filed Dec. 22, 1944 4 Sheets-Sheet 4
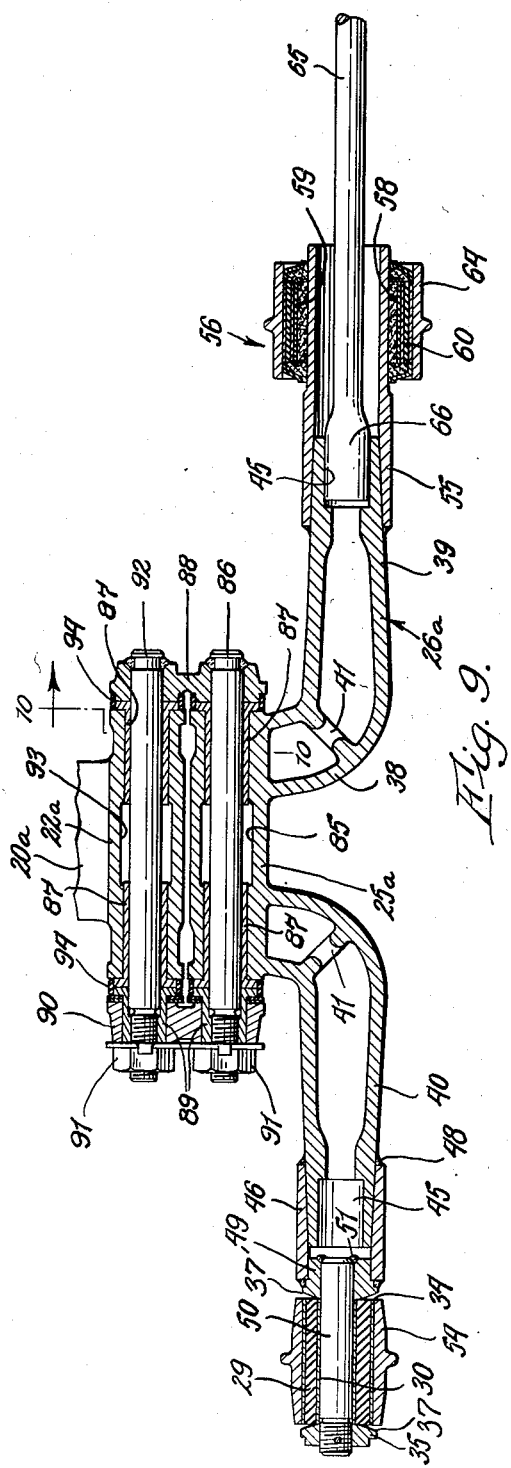
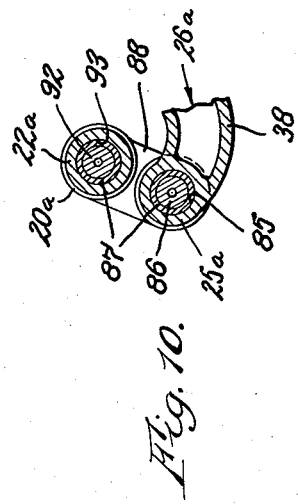
INVENTOR
Albert F. Hickman
BY
Popp and Popp
ATTORNEYS Patented Jan. 2, 1951

2,536,933

UNITED STATES PATENT OFFICE 2,536,933

VEHICLE SPRING SUSPENSION

Albert F. Hickman, Eden, N. Y., assignor to Hickman Pneumatic Seat Co. Inc., Eden, N. Y., a corporation of New York Application December 22, 1944, Serial No. 569,302

7 Claims. (Cl. 280—124)

This invention relates to a vehicle spring suspension and more particularly to a spring suspension for a so-called frameless bus, that is a bus having no continuous longitudinal members to which the spring suspension is connected.

One of the principal objects of the invention is to reduce and cushion the lateral impacts from the axle against the body of the vehicle which is subject to a high percentage of load variation.

Another object is to provide such a spring suspension in which the vertical and lateral impacts are adequately resisted or cushioned both when the vehicle is loaded and unloaded and without imposing undue end thrusts on the pivotal connections which connect the axles to the body.

Another object is to provide such a spring suspension in which geometric resilient resistance is obtained in a compact structure which requires no lubrication and is free from the squeaks incident to the use of leaf springs.

Another object of the invention is to provide such a spring suspension in which the distribution of the load to the body is at a plurality of points.

Another object of the invention is to avoid all leaf spring friction by the use of torsion rods or the like. With heavy vehicles supported on leaf springs the spring friction is extremely high when the vehicle is unloaded so as to render the vehicle practically unsprung.

Another object is to provide such a spring suspension in which the side sway is reduced to any desired amount.

Another object is to provide such a spring suspension in which periodic vibration of the suspension is dampened out and in which wheel tramp is avoided.

Another object is to provide such a suspension in which all forces are cushioned so as to increase gasolene mileage and decrease tire wear.

Another object is to provide a spring suspension for such a so-called frameless bus and employing a relay in which identical bearings are employed throughout and of small inside diameter thereby to adapt such bearings to the use of rubber bushings to provide the necessary oscillation of the parts.

Another object is to provide such a spring suspension for a so-called frameless bus, and not employing a relay, but being directly connected with the torsion springs in which, with the exception of one bearing, the bearings are identical throughout and of small inside diameter thereby to adapt such identical bearings to the use of rubber bushings to provide the neccesary oscillation of the parts.

Another object is to provide such a suspension including a tubular crank arm which is so constructed that while carrying the large load imposed upon a bus suspension by bearings spaced 60 inches apart it is still relatively light in weight.

Another object is to provide such a suspension having light unsprung weight.

Another object is to provide such a suspension in which the metal stresses are within safe working limits of heat treated forgings or castings.

Another object is to provide such a suspension which can be produced at low cost and in particular requires only simple machining operations.

Another object is to provide such a suspension arranged inside of the wheels and in which the parts are located close to the wheels to provide wide pivot positions and increased stability.

Another object is to provide such a suspension which is adapted to the use of rubber springs in place of the torsion rods shown.

Another object is to provide such a suspension employing rubber bushings as bearings between parts which oscillate relative to each other, and in which simple and inexpensive means are provided for permitting slight angular and endwise movement of the axes of the parts relative to each other, this being accomplished by providing a pair of heads on the corresponding part and which have opposing annular faces engaging the opposite ends of the central metal sleeve of the rubber bushing and receding axially from the rubber bushing toward the margin of said surfaces.

Other objects of the invention are disclosed in detail in the following description and drawings in which:

Fig. 1 is a fragmentary top plan view of a spring suspension embodying my invention.

Fig. 2 is a vertical transverse sectional view thereof, taken on line 2—2, Fig. 1.

Fig. 3 is a laid out enlarged section through the linkage pivotally connecting each end of each axle with the body of the vehicle.

Figs. 4 and 5 are fragmentary vertical sections taken on the correspondingly numbered lines on Fig. 3.

Fig. 6 is a side elevation of a modified form of crank arm employed in the suspension.

Fig. 7 is a vertical transverse sectional view taken on line 7—7, Fig. 8 and showing a modified form of the invention in which a relay is employed.

Fig. 8 is a laid out section through the linkage of the modified form of the invention shown in Fig. 7, this section being taken generally on line 8—8, Fig. 7.

Fig. 9 is a view similar to Fig. 3 and showing a further modified form of the invention.

Fig. 10 is a fragmentary vertical section taken on line 10—10, Fig. 9.

The various forms of the invention are particularly designed to be applied to a body having transverse bars 15 flanking the drive axle 16 and connecting at their ends with longitudinal bars 18 which terminate at the space occupied by the drive axle 16, this type of body being principally used in connection with buses and being commonly known as a frameless body. The axle 16 is shown as supported by dual wheels 19 at its opposite ends.

In the form of the invention shown in Figs. 1-5, to each end of the axle 16 is secured an axle bracket 20 which is fast to the axle and is formed to provide an outwardly extending horn or gooseneck at its upper end, the outer extremity of this horn or gooseneck being arranged close to the adjacent wheel 19. At its upper outer extremity this axle bracket 20 carries an axle pivot pin 21 which, as best shown in Fig. 3, is held in the bore of a sleeve 22 formed at the extremity of the axle bracket and extending horizontally transversely of the axle. The opposite ends of each axle pivot pin 21 are connected by shackles 23 with the ends of a crank arm pivot pin 24, each crank arm pivot pin being secured in the offset part 25 of a crank arm indicated generally at 26 and being journaled at its opposite ends in the transverse bars 15 of the vehicle body as hereinafter described.

Each shackle 23 is provided at its opposite ends with bores 28 in which is pressed a rubber bushing 29. Each of these rubber bushings is lined with a sheet metal sleeve 30 which is tightly fitted around the corresponding end of the pin 21 or 24 and can be provided with an inwardly projecting rib 31 which fits into an axially extending groove provided in the associated end of the pin. Each of these rubber bushings is also held in a sheet metal sleeve 34 which is tightly fitted in the corresponding bore 28 of the shackle. The parts are held in position by nuts 35 screwed on the ends of the pins 21, 24 and being shown as held in place by cross pins 36. The faces of these nuts 35 which engage the sleeve 30 lining the rubber bushings, as well as the opposing faces of the axle bracket 20 and crank arm 26 recede axially and toward their outer margins away from the rubber bushing 29 and are preferably rounded as indicated at 37 to permit a limited movement of the pins 21 and 24 out of parallelism with each other. At the same time these annular receding or rounding faces engage the opposite ends of the central metal sleeves 30 or the rubber bushings 29 and hence while also permitting a limited axial movement of the pins in response to axial or thrust forces, the nuts 35 are capable of being tightened to a fixed stop through the endwise metal to metal engagement of the central structure 22 or 25, central metal sleeves 30 and end nuts 35. The shackles 23 oscillate about the pins 21, 24, such oscillation being permitted by the yield of the rubber bushings, these rubber bushings thereby providing bearings which are free from lubrication or other servicing difficulties. It will particularly be noted that with the arrangement of the rubber bushings in the shackles 23 and around the pins 21, 24, the bushings can be of small inside diameter and large outside diameter, thereby to provide the necessary body of rubber without requiring large bores, and corresponding increased weight in the axle brackets and crank arms.

The crank arm 26 is in the form of a tubular forging or casting, the tubular form continuing from one end thereof to the other through the offset portion 25, crank arms 38 and coaxial ends 39 and 40. Internal reinforcing ribs 41 are preferably provided at the juncture of the crank arms 38 and the coaxial ends 39 and 40 and the offset portion 25 is preferably provided with a central cross web 42 and enlarged end portions 43 to adequately grip the crank arm pivot pin 24. The crank arm is also symmetrical, the opposite extremities of the same being externally tapered, and also is provided with an oval axially extending bore 45. By the symmetrical form of the crank arms 26, it is unnecessary to provide "rights" and "lefts" and the same crank arms can be used at each end of each axle.

The right hand end 40 of each crank arm, as viewed in Figs. 1 and 3, is journaled in the adjacent cross bar 15 of the vehicle body and to employ the same rubber bushings as are used at the ends of the pins 21 and 24, an internally tapered sleeve 46 is fitted over the tapered end 40 and welded thereto, as indicated at 48, with its end projecting axially outward from the crank arm 26. In the bore of this tapered sleeve 46 is welded a plug 49 having a bore in which is fitted a pin 50, this pin projecting outwardly from the plug and being welded thereto as indicated at 51. Around the projecting end of this pin 50 is fitted a rubber bushing which is identical to the rubber bushings 29 of the shackles 23, and the same reference numerals thereby being applied. The outer end of the plug 49 is rounded to recede from the rubber bushing, as indicated at $37^1$ and the rubber bushing is held against this rounded end by a rounding nut similar to the nut 35 and similarly rounded as indicated at 37 at each end of the pins 21, 24, the same reference numerals likewise being employed. The rubber bushing 29 for the pin 50 is held in the bore 53 of a bearing bracket 54, this bearing bracket being secured to the corresponding cross bar 15 of the vehicle body in any suitable manner. It will be seen that the rounding or receding annular surfaces 37, $37^1$ permit a limited movement of the pin 50 out of parallelism with the bearing bracket 54, and also permit a limited axial movement of this pin in this bearing bracket while at the same time the nut 35 is tightened to a fixed stop.

To the tapered end 39 of the crank arm 26 is fitted a sleeve 55, the projecting end of this sleeve 55 being journaled in a bearing indicated generally at 56. This bearing is necessarily larger than the other bearings and preferably has a bushing 58 of self lubricating bearing metal encased in a metal sleeve 59 and surrounded by a rubber bushing 60 which in turn has inner and outer metal sleeves, the inner metal sleeve being tightly fitted on the sleeve 59 of the bushing 58 and the outer sleeve being tightly fitted in the bore of a bearing bracket 64. This bearing bracket 64 is secured to the cross bar 15 opposite the bearing bracket 54 so that the crank arm 26 is journaled at its opposite ends in the bearing brackets 54 and 64 which are fast to the cross bars 15 on opposite sides of the axle 16.

The rotation of each crank arm 26 is restrained by a torsion rod 65 which has its live end enlarged and ovalled, as indicated at 66, to fit into the ovalled bore 45 at the end of the crank arm adjacent the bearing 56, and extending through the larger sleeve 55 for this purpose. The ovalled end 66 of the torsion rod and the sockets 45 are preferably formed as described in my Patent No. 2,213,004 granted August 27, 1940, for Torsion Rod Mounting. The dead end 68 of the torsion rod, as shown in Fig. 1, is similarly ovalled and is fitted in the ovalled bore of a socket 69, which can be rotatably anchored on the body of the vehicle in any suitable manner. The force imposed on the anchored end of the torsion rod is shown as determined by an arm 70 fast to the socket 69 and carrying an adjusting screw 71 which can work against an adjacent part of the body of the vehicle.

In the operation of the suspension, the upward movement of one end of the axle 16, through its shackles 23, swings the outer or offset portion 25 of its crank arm 26 upwardly, this crank arm oscillating about its bearings 56 and 29 in the bearing brackets 64 and 54, respectively. This rotation of the crank arm is yieldingly resisted by the torsion rod 65 which has its live ovalled end 66 fitted in the ovalled socket 45 at the end of the crank arm carrying the bearing bracket 64 and its dead end 68 anchored in the socket 69. The torsion rods 65 thereby provide the springs for supporting the body of the vehicle on the axles.

It will be noted that the shackles 23 are inclined upwardly and inwardly from the crank arm pivot pins 24 to the axle pivot pins 21. This upward and inward inclined arrangement of the shackles tends to cause each axle to centralize itself in a direction transverse of the body and enables the action of gravity to geometrically and resiliently resist any such movement of the axle away from its central position. This permits the vehicle body to move substantially straight ahead despite a certain amount of lateral movement of the axle. This arrangement of the shackles further provides high and wide pivot positions which provides increased stability in that it provides effective spring centers which can be as wide or wider than the track of the vehicle. Further, this arrangement of the shackles reduces sidesway, the high and wide pivot positions, together with the upward and inward slant of the shackles, providing a suspension in which the vehicle body is more nearly suspended than mounted. Other important advantages which flow from the inclined arrangement of the shackles shown are the reduction in the possibility of wheel tramp and in the elimination of the need for anti-body-roll devices, such as torsion bar stabilizers.

When one end of the axle 16 is so forced upwardly relative to the body, the effective resilient opposing force of the torsion rod 65 increases at a geometric and not at an arithmetic rate. In this particular case the geometric rate is of the accelerated increase type in which increments of vertical movement of the axle are opposed by an accelerated rate of resilient resistance. This is primarily due to the progressive decrease in the effective leverage of the crank arms 26 as they swing upwardly and inwardly about the torsion rod 65 as an axis of rotation. This action is also influenced by the varying angularity of the shackles 23 and the fact that increments of vertical displacement of the pivot pins 24 cause accelerated rates of increase in the angular displacement of the torsion rod 65. This latter is due to the fact that increments of vertical movement of said pivot pins 24 are not proportional to the accompanying increments of angular twist to which their companion torsion rod 65 is subjected.

This geometric action also occurs when the axle 16 moves downwardly relative to the body from the normal position shown in Fig. 2. Throughout this particular movement the geometric action is of the accelerated decrease type, that is, as the axle passes through increments of downward movement, the rate of decrease of the resilient force tending to push the axle downward increases.

By this means, so far as vertical forces are concerned, the vehicle body is free to "float" along solely under the influence of gravity (plus whatever vertical momentum forces are present), this feature of the invention being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and the body. Such a desirable result is quite different from that obtained from the conventional leaf spring suspension in which the axle and the rest of the unsprung weight drags or jerks down the body whenever the strains imposed on the main frame is negative. In the present suspension no such negative force, tending to pull the body downward, is possible.

A feature of the invention resides in the construction of the parts for use in a so-called frameless bus and in which the crank arm 26 is necessarily long and journaled at its extremities in the cross bars 15 of the bus and which are necessarily spaced further apart than the diameter of the traction wheels 19. To this end this crank arm is made in the form of a forging which is tubular from one end to the other and is provided with sleeves at its opposite ends which are journaled in the body bearings. It will also be noted that with this crank arm the enlarged ovalled live end 66 can be directly secured in one of the sockets provided at each end of the crank arm and that the sleeve at the opposite end can carry a pin 50 of the same diameter as the pins 21 and 24 so that identical rubber bushings 29 can be used for all of these pins. Since the crank arm 26 can be used either as a left or right; the pins 21 and 24 and their nuts identical; the bearings 29 for the pins 21, 24 and 60 also identical; and all of the torsion rods 65 and their anchorages the same, it will be seen that the spring suspension can be constructed and installed at low cost and that servicing expense is greatly reduced.

It will also be noted by housing the rubber bushings 29 for the pins 21 and 24 in the shackles 23 instead of in the crank arm 26 and axle bracket 20, that the pins 21 and 24 can be located close together and a compact structure achieved and at the same time the necessary volume or bulk of rubber can be provided to supply the necessary action. It will be appreciated that in order to provide the necessary twist, the radial thickness of the rubber bushings 29 must be sufficient to permit the rotation of its outer sleeve 31 relative to its inner sleeve 30 without destructive distortion of the rubber. This requires that rubber bushings of this character be comparatively large depending upon the degree of rotation involved. By locating these rubber bushings in the shackles 23, they can be arranged practically side by side, as shown in Fig. 3, thereby to bring the pins 21 and 24 in closely spaced relation to each other. At the same time these rubber bushings are spaced axially further apart and through their close relation radially and spaced relation axially are better positioned to withstand the corner loading caused by the thrust due to braking.

By the use of rubber in all of the bearings, including the bearing 56, any misalinement of the parts is provided for, and by the use of the self lubricated bushing 59 in the bearing 56 the necessary rotative movement of the parts is permitted without requiring a large bearing as would be the case if rubber alone were used on a sleeve having the large diameter of the sleeve 55. By this arrangement the spring suspension can readily be used on a vehicle having a capacity of 18,000 pounds per axle and having a high percentage of load variation.

With the tubular forged crank arm 26, the crank arm has the necessary outside size to carry the large load of 18,000 pounds per axle while supported on its bearings spaced approximately five feet apart and at the same time the crank arm is comparatively light. It will also be noted that the major portions, that is the end portions, are in line with the body bearings so that these major portions are sprung weight except as to rotation about their axis. Only the offset portion 25 is unsprung and this portion is only unsprung vertically and completely sprung laterally.

In the modified form of crank arm shown in Fig. 6, the crank arm and its journals are made in one piece. Thus the sleeve 55a is made integral with the body of the crank arm and the pin 50a is likewise made integral with the body of the crank arm. Since in other respects the crank arm shown in Fig. 6 is identical to that shown in Figs. 1–5, the same reference numerals have been employed.

In the form of the invention shown in Figs. 7 and 8 a relay is interposed between the crank arm and the live end of the torsion rod, the relay being a motion transmitting device which permits the torsion rod to be located other than coaxial with the crank arm.

In the form of the invention shown in Figs. 7 and 8, the axle bracket 20, crank arm 26, shackles 23 and body bearing 54 are the same as with the form of the invention shown in Figs. 1–5 and the same reference numerals have therefore been applied. However the sleeve 72 is longer than the corresponding sleeve 55 of the form of the invention shown in Figs. 1–5 and has welded therein a journal pin which is identical with the journal pin 59 of the form of the invention shown in Figs. 1–5, the same reference numerals therefore having been applied to this pin and its mounting to the bearing connecting this pin with the adjacent cross bar 15 of the body.

To the sleeve 72 is welded an arm 73 which normally projects inwardly in a generally horizontal direction and is of tubular form at its outer end to receive a rubber bushing 29, this rubber bushing and its associated metal sleeves being identical with the other rubber bushings 29 heretofore described and the same reference numerals being used. In the inner sleeve 30 of this rubber bushing 29 is tightly fitted a pin 74 the opposite ends of which are connected by links or shackles 75 with the ends of a similar pin 76. The pin 76 is journaled in a similar rubber bushing 29 in the free end of an arm 77 and the portions of the links 75 which engage the ends of the rubber bushings 29 are preferably in the form of rounding bosses so as to compensate for misalinement of the parts. The links 75 are shown as held in position by nuts 79 on the threaded ends of the pins 74 and 76.

The mounted end of the arm 77 is bifurcated and has a pin 80 which is fast to its bifurcations and extends therebetween parallel with the other bearing pins of the suspension. This pin is tightly fitted in the inner sleeve 30 of another rubber bushing 29 which is identical to the other rubber bushings of the suspension and this bushing 29 is tightly fitted in the bore of a body bearing block or bracket 81. This bearing block or bracket 81 can be secured in any suitable manner to the adjacent cross bar 15 of the body.

One of the bifurcations of the arm 77 is formed to provide an ovalled socket 83 which is axially in line with the pin 80 and receives the ovalled live end 66 of a torsion rod 65, this torsion rod being similar to and having its dead end anchored in the same manner as the torsion rod 65 of the form of the invention shown in Figs. 1–5.

It will be noted that the shackles 75 are provided at their opposite ends and on their opposing faces with bosses having annular rounding or axially receding faces 84 which surround the pins 74, 76, and it will be noted that similar opposing rounding or axially receding faces 84 are provided at the extremities of the bifurcated arm 77 around the pin 80. These faces act in the same manner as the faces 37, 37¹ to permit a limited misalinement of these pins 74, 76 and 80, both angularly and axially while at the same time the sleeves 30 provide solid metal spacers.

It will be seen that the suspension shown in Figs. 7 and 8 functions in the same way as the suspension shown in Figs. 1–5 except that a relay is interposed between the crank arm 26 and the live end of the torsion rod 65. Thus the oscillation of the crank arm 26 through its arm 73 transmits motion through the links 75 to effect a similar oscillation of the arm 77, this arm 77 being fast to the live end of the torsion rod 65. It will particularly be noted, however, that all of the bearings of the suspension shown in Figs. 7 and 8 are in the form of the identical rubber bushings 29 which effects economy in the manufacture and maintenance of the suspension.

While the use of rubber bushings in the shackles 23 and at the outboard ends of the pins 21 and 24 as shown in Figs. 1–5 is a desirable feature to secure close spacing of these pins, it will be seen that this feature is not necessary to the practice of the invention as shown in Figs. 9 and 10, a suspension for the front axle of the vehicle being illustrated in these figures. In this form of the invention illustrated in Figs. 9 and 10, the crank arm 26a, with the exception of its bore in the offset 25a for receiving the crank arm pin, is similar to the crank arm in the form of the invention shown in Figs. 1–5 and the same reference numerals have therefore been employed for this crank arm 26a and its mounting and connection with the torsion rod 65. However, the bore 85 for its crank arm pin 86 is enlarged to receive a pair of bushings 87 at its opposite ends, these bushings preferably being of the self lubricating metal type. The opposite ends of the pin 86 are carried in these bushings, one end of this pin 86 being shown as welded to a shackle 88 and the other end as extending through a bushing 89 in a shackle 90, the pin and shackles being held in position by a nut 91. The opposite ends of the shackles 88 and 90 are similarly connected to a pin 92 which is similarly journaled in bearing bushings 87 in the bore 93 at the end 22a of an axle bracket 20a which is otherwise identical with the axle bracket 20 of the form of the invention shown in Figs. 1–5. The opposing ends of the bushings 87 and 89 and the opposing ends of the bushings 87 and the shackles 90 are preferably enclosed by dust seal bands 94. It will be seen that except for the substitution of self lubricated metal bearings in the crank arm and axle bracket for the rubber bushings shown in Figs. 1–5, the form of the invention shown in Figs. 9 and 10 is identical to that shown in Figs. 1–5 and operates in the same manner.

From the foregoing it will be seen that all forms of the invention provide a suspension which has light unsprung and total weight; is particularly adapted to use in so called frameless buses in which there are no longitudinal structural members between the cross members supported by the suspension; the suspension is adapted to the use of small diameter rubber bearings and bearings of identical size and type. Further the design accommodates a crank arm of 6 inches maximum length and has clearance for lateral movement of at least 1½ inches, this providing the necessary movement for a bus. The necessity for self aligning bearings occasioned by the long space between bearings is also economically provided by the use of rubber, the suspension being rendered low in cost and free from machining difficulties as well as free from lubrication difficulties. The bearings are also subject to low static loads and are free from excess corner loading because of their wide spacing. It will also be seen that the form of axle bracket shown with its upright part inside of the shackles allows the crank arms and shackles to be widely spaced and located close to the wheels of the vehicle.

While torsion rods have been shown to supply the resilience, it will be appreciated that other forms of resilient means could be employed, particularly torsion devices of rubber or other soft resilient plastic material.

I claim as my invention:

1. A vehicle spring suspension for connecting the body and wheeled axle of a vehicle, said body having side beams connected by a pair of cross beams, each cross beam of said pair being arranged fore-and-aft, respectively, of the wheels supporting said axle, comprising an elongated crank shaft extending longitudinally of said body between said pair of cross beams and having each end disposed adjacent a corresponding one of said cross beams, the central part of said crank shaft being offset horizontally outward to provide a crank arm, a bearing bracket for each end of said crank shaft, each of said bearing brackets being connected independently of and in spaced relation to said side beams with the corresponding one of said cross beams, an axle pivot connected to said axle and arranged above said crank arm, shackle means pivoted at its upper end on said axle pivot and at its lower end to said crank arm, and resilient means interposed between said body and crankshaft and arranged to resist rotation of said crank shaft.

2. A vehicle spring suspension for connecting the body and wheeled axle of a vehicle, comprising an axle bracket on said axle and projecting upwardly therefrom, an axle pivot pin secured to said axle bracket and having its opposite ends projecting horizontally outward therefrom transversely of said axle, an elongated crank shaft extending longitudinally of said body with its central part offset horizontally outward to provide a crank arm having a portion extending parallel with the major axis of the crank shaft, a coaxial pivot pin non-rotatably secured in and extending through the parallel portion of said crank arm and having its opposite ends projecting outwardly therefrom, a pin projecting coaxially from one extremity of said crank shaft, a bearing connecting the opposite extremity of said crank shaft with said body, said pins being of the same diameter, identical bearings each embracing each end of each pin, shackle means connecting the said identical bearings embracing said axle pivot pin and said crank arm pivot pin, means connecting said identical bearing embracing the pin at said one extremity of said crank shaft with said body, and resilient means interposed between said body and crank shaft and arranged to restrain rotation of said crank shaft.

3. A vehicle spring suspension for connecting the body and wheeled axle of a vehicle, comprising an axle bracket on said axle and projecting upwardly therefrom, an axle pivot pin secured to said axle bracket and having its opposite ends projecting horizontally outward therefrom transversely of said axle, an elongated crank shaft extending longitudinally of said body with its central part offset horizontally outward to provide a crank arm having a portion extending parallel with the major axis of the crank shaft, a coaxial pivot pin secured to and extending through said parallel portion of said crank arm and having its opposite ends projecting outwardly therefrom, a pin projecting coaxially from each extremity of said crank shaft, said pins being of the same diameter, identical bearings each embracing each end of each pin, shackle means connecting the said identical bearings embracing said axle pivot pin and said crank arm pivot pin, and means connecting the other of said bearings with said body, and resilient means interposed between said body and crank shaft and arranged to restrain rotation of said crank shaft.

4. A vehicle spring suspension for connecting the body and wheeled axle of a vehicle, comprising an axle bracket on said axle and projecting upwardly therefrom, an axle pivot pin secured to said axle bracket and having its opposite ends projecting horizontally outward therefrom transversely of said axle, an elongated crank shaft extending longitudinally of said body with its central part offset horizontally outward to provide a crank arm having a portion extending parallel with the major axis of the crank shaft, a coaxial pivot pin secured to and extending through said parallel portion of said crank arm and having its opposite ends projecting outwardly therefrom, a sleeve secured to and projecting coaxially from one extremity of said crank shaft, a pin projecting coaxially from the other extremity of said crank shaft, a pin projecting coaxially from the extremity of said sleeve, said pins being of the same diameter, identical bearings each embracing each end of each pin, shackle means connecting said identical bearings embracing said axle pivot pin and said crank arm pivot pin, means connecting the other of said bearings with said body, a rock arm fast to said sleeve, and resilient means interposed between said body and rock arm and arranged to restrain rotation of said rock arm.

5. A vehicle spring suspension for connecting the body and wheeled axle of a vehicle, said body having side beams connected by cross beams and said cross beams being arranged fore-and-aft of the wheels supporting said axle, comprising an elongated crank shaft extending longitudinally of said body between said cross beams adjacent each wheel and having each end disposed adjacent a corresponding one of said cross beams, the central part of each of said crank shafts being offset horizontally outward to provide a crank arm, a bearing connecting each end of each crank shaft with the corresponding one of said cross beams, an upwardly projecting axle bracket secured to each end of said axle and arranged between said crank arms and the center of said axle, the upper end of each axle bracket being in the form of a horizontally outwardly extending gooseneck having its extremity above the corresponding crank arm and in a vertical plane outside of the vertical plane intersecting the fulcrum of said crank shaft, shackle means pivoted at its upper end to said extremity of each axle bracket and at its lower end to the corresponding crank arm, and resilient means to resist rotation of said crank shaft.

6. A crank shaft for a vehicle spring suspension adapted to be journalled at its opposite ends in spaced coaxial bearings, comprising a one-piece tubular metal body having coaxial tubular ends and a central tubular part offset relative to the axis of the coaxial ends to provide a crank arm, a separate pin housed in and secured to and projecting coaxially from one of said coaxial tubular ends and adapted to be journalled in one of said bearings, and a separate sleeve embracing and secured to and projecting coaxially from the extremity of the other of said coaxial ends and adapted to be journalled in the other of said bearings.

7. In a vehicle spring suspension for connecting a body having a pair of spaced coaxially disposed bearings with the wheeled axle of a vehicle and having a torsion rod arranged in generally coaxial relation with said bearings and anchored in said body at its dead end remote from said bearings and having an out of round live end arranged adjacent one of said bearings, the combination therewith of a crank shaft for transmitting motion from said axle to said torsion rod, comprising an elongated tubular crank shaft body having coaxial ends and a central part offset relative to the axis of said coaxial ends to provide a crank arm, a plug secured in one extremity of one of said coaxial ends, a pin secured in said plug to project therefrom coaxially with said coaxial ends and journalled in the other of said bearings, the other extremity of the other of said coaxial ends being formed to provide an axially extending out of round socket receiving said out of round live end of said torsion rod, and a sleeve secured to said socket and projecting coaxially from said other of said coaxial ends and journalled in said one of said bearings.

ALBERT F. HICKMAN.

REFERENCES CITED

The following references are of record in the file of this patent:

UNITED STATES PATENTS

| Number | Name | Date |
|---|---|---|
| 725,787 | Smith | Apr. 21, 1903 |
| 1,541,276 | Powell | June 9, 1925 |
| 1,971,676 | Borst | Aug. 28, 1934 |
| 2,028,551 | Lord | Jan. 21, 1936 |
| 2,103,185 | Rumpler | Dec. 21, 1937 |
| 2,160,862 | Hickman | June 6, 1939 |
| 2,297,465 | Froehlich | Sept. 29, 1942 |
| 2,333,650 | Hickman | Nov. 9, 1943 |
| 2,344,983 | Fageol | Mar. 28, 1944 |

FOREIGN PATENTS

| Number | Country | Date |
|---|---|---|
| 13,004 | Great Britain | of 1885 |
| 434,583 | Great Britain | Sept. 4, 1935 |
| 451,490 | Great Britain | Aug. 6, 1936 |
| 809,234 | France | Dec. 3, 1926 |